Dec. 16, 1958  M. H. KEMP  2,864,631
STUFFING BOXES

Filed June 29, 1954  3 Sheets-Sheet 1

INVENTOR.
BY MANNING H. KEMP
ATTORNEY.

Dec. 16, 1958   M. H. KEMP   2,864,631
STUFFING BOXES

Filed June 29, 1954   3 Sheets-Sheet 2

INVENTOR.

BY MANNING H. KEMP

ATTORNEY.

INVENTOR.
BY MANNING H. KEMP
ATTORNEY.

United States Patent Office 2,864,631
Patented Dec. 16, 1958

2,864,631

STUFFING BOXES

Manning H. Kemp, West Monroe, La., assignor to The Pure Oil Company, Chicago, Ill., a corporation of Ohio Application June 29, 1954, Serial No. 440,055

3 Claims. (Cl. 286—26)

This invention relates to stuffing boxes, more particularly to stuffing boxes for marine application on propeller shafts and rudder stocks.

In the conventional type stuffing box, now in use on marine propeller shafts, it is necessary to drydock the boat in order to replace the packing. My invention provides a means for sealing the stuffing box against leakage of water so that the packing can be removed and replaced in the stuffing box while the boat is afloat. This is accomplished by providing an inflatable tube surrounding the shaft at the rear end of the stuffing box which can be inflated by air or other gas, so that it abuts snugly against the shaft and seals it against the ingress of water.

In conventional stuffing boxes, new packing is placed in the same position as the worn-out packing so that excessive wear occurs at one spot on the shaft. By providing a plurality of lantern rings and a plurality of spaced grease passageways in the main stuffing box body member in accordance with my invention, the position of the packing members can be shifted at the time they are renewed so as to be in contact with different portions of the shaft, and thereby permit substantially uniform wear on that portion of the shaft enclosed within the stuffing box. Service of the shaft between necessary repairs thereto is accordingly prolonged.

An object of the invention is to provide a novel stuffing box, particularly adapted for use on marine propeller shafts or rudder stocks.

Another object of the invention is to provide a stuffing box in which the packing can be changed without drydocking the boat.

A still further object of the invention is to provide a stuffing box in which the position of the packing elements with relation to the shaft can be changed.

Still another object of the invention is to provide a method for replacing the packing in a stuffing box subject to water pressure without removing the instrumentality, of which the box forms a part, from the surrounding water.

Other objects of the invention will become manifest from the following description and the accompanying drawing, of which Figure 1 is a longitudinal cross-sectional view of a stuffing box and sealing device in accordance with my invention;

Figure 1:
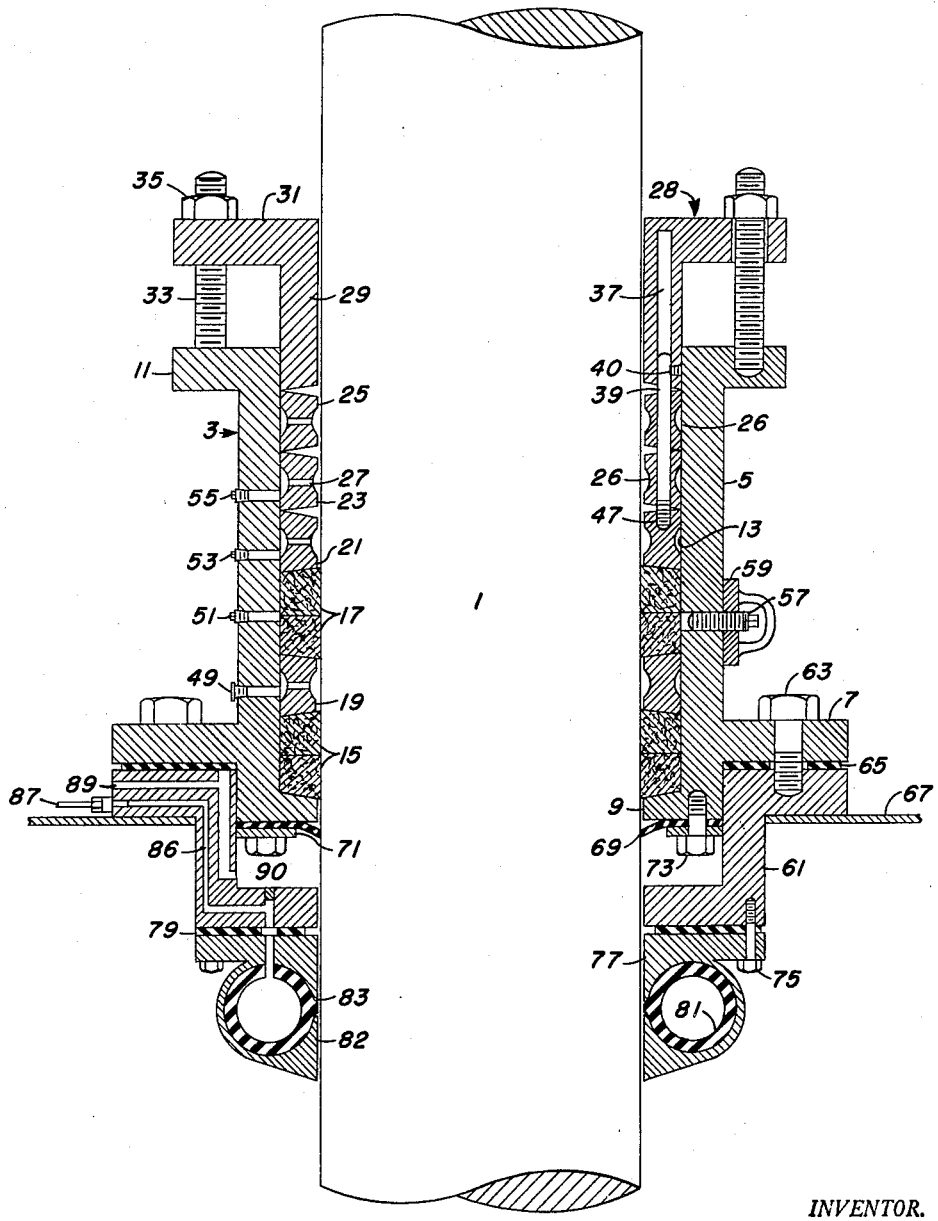
Figure 2:
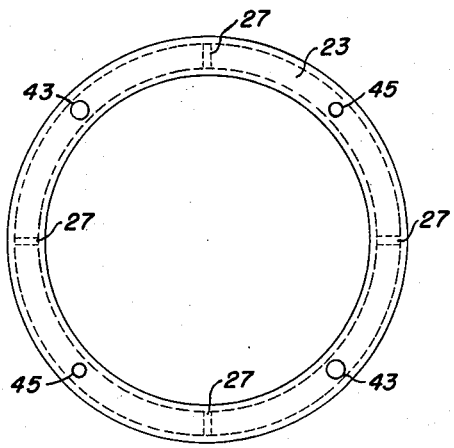
Figure 2 is an end view of a lantern ring forming an element of the stuffing box.

Referring to the drawing, the numeral 1 indicates a fragment of the propeller shaft of a power driven vessel or boat, and the numeral 3 indicates, generally, a stuffing box through which shaft 1 passes. The main body 5 of the stuffing box is provided at its rear end with an outwardly extending flange 7 and an inwardly extending flange 9. The forward end of the main body 5 is provided with an outwardly extending flange 11. The main body 5 of the stuffing box is cylindrical and the inner wall 13 is spaced a sufficient distance from the periphery of the shaft to accommodate packing rings or elements 15 and 17 and lantern rings 19, 21, 23 and 25. The lantern rings have an annular recess 26 on both the inner and outer periphery, connected by a plurality, preferably four, grease passageways 27. The packing rings may be made of any suitable packing material such as braided or woven hemp or asbestos, containing a suitable binder and lubricant.

In order to facilitate removal of the packing rings and lantern rings when the packing is to be renewed, it may be desirable to use split packing and lantern rings, preferably rings formed in two matching parts.

A gland 28 has a cylindrical portion 29 which is adapted to be accommodated between the main stuffing box body 5 and the shaft 1, and an outwardly extending flange 31, having a plurality of evenly spaced passageways therethrough to accommodate studs 33, the rear ends of which are securely screwed into flange 11. The tightening gland 28 may be split in two equal pieces in order to facilitate its removal from the shaft. Nuts 35 are provided on the ends of studs 33 to tighten the gland.

The cylindrical portion of the gland is formed with at least two elongated bores 37 adapted to accommodate rods 39. Set screws 40 are provided to hold rods 39 in any desired position in bores 37.

The lantern rings are formed with bores 43 to accommodate rods 39. The bores 43 are spaced between the grease passageways 27. Threaded recesses 45 are also tapped through lantern rings 21, 23 and 25 into which the threaded ends 47 of the rods 39 can be screwed. Lantern ring 19 is provided with grease passageways, but not with bores 43 or threaded recesses 45.

The main body 5 of the stuffing box is provided with a plurality of longitudinally spaced grease passageways 49, 51, 53 and 55 corresponding in number to the number of lantern rings in the stuffing box. A plurality of lock screws 57, preferably three in number, are threaded into the main stuffing box body at equally spaced points around the periphery of the body for the purpose to be hereinafter described. Acorn nuts 59 are provided to lock and seal screws 57.

An adaptor 61 is fastened to the rear end of the main stuffing box body by means of bolts 63. A gasket 65 is provided between the flange 7 and adaptor 61 in order to provide a fluid-tight seal. The adaptor 61 is welded, bolted, or otherwise securely fastened, to bulkhead 67. A neoprene grease seal 69 is provided at the rear end of the main stuffing box body 5 and held in place by means of retainer ring 71, which in turn is securely fastened to the stuffing box body 5 by screws 73.

Fastened to the rear end of adaptor 61 by means of screws 75 is an annular metal casing 77. A rubber or other suitable gasket 79 between the adaptor 61 and casing 77 provides a fluid-tight seal. The metal casing 77 has an annular, hollow space surrounding the shaft 1 adapted to accommodate an inflatable hollow tube 81 which, when inflated, fits snugly in said space. The inner periphery 82 of the casing is cylindrical and machined to accommodate shaft 1. The metal casing 77 has an annular slit 83 opening into the hollow space from the inner periphery 82 in order to permit the tube 81, when inflated under pressure, to contact the shaft 1 and form a liquid-tight seal therewith. The inflatable tube 81 may be made of neoprene or other elastomer which has sufficient strength and resistance to sea water, oil and grease. The slit 83 is of sufficient width to permit insertion of the tube into the casing. The width may be approximately 2-6 inches, depending on the size and thickness of the tube.

A passageway 86 in adaptor 61 connects the tube 81 to a source of air or other gas pressure 87. Tube 81 is formed with a stem 88 extending into passageway 86. A second passageway 89 in adaptor 61 is connected to the space 90 between the adaptor 61 and the end of the stuffing box body 5. The passageways 86 and 89 are placed at the top of the adaptor in order to prevent contamination with dirt and other materials which may accumulate at the bottom of the stuffing box housing and the outer end of passageway 89 is fitted with a valve (not shown).

Figure 4:
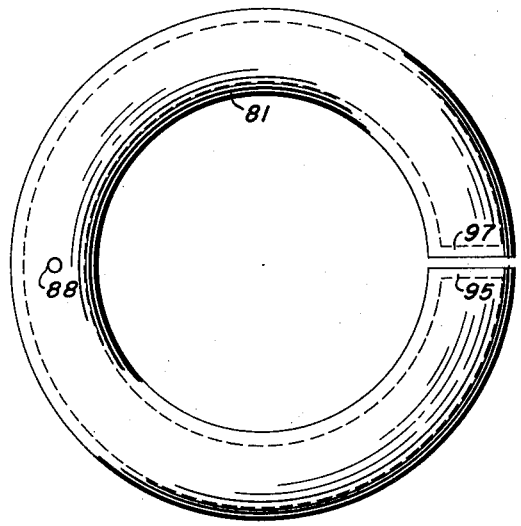
Figure 4 is a side elevational view of a split tube forming part of the novel sealing device shown in Figure 3.
Figure 3:
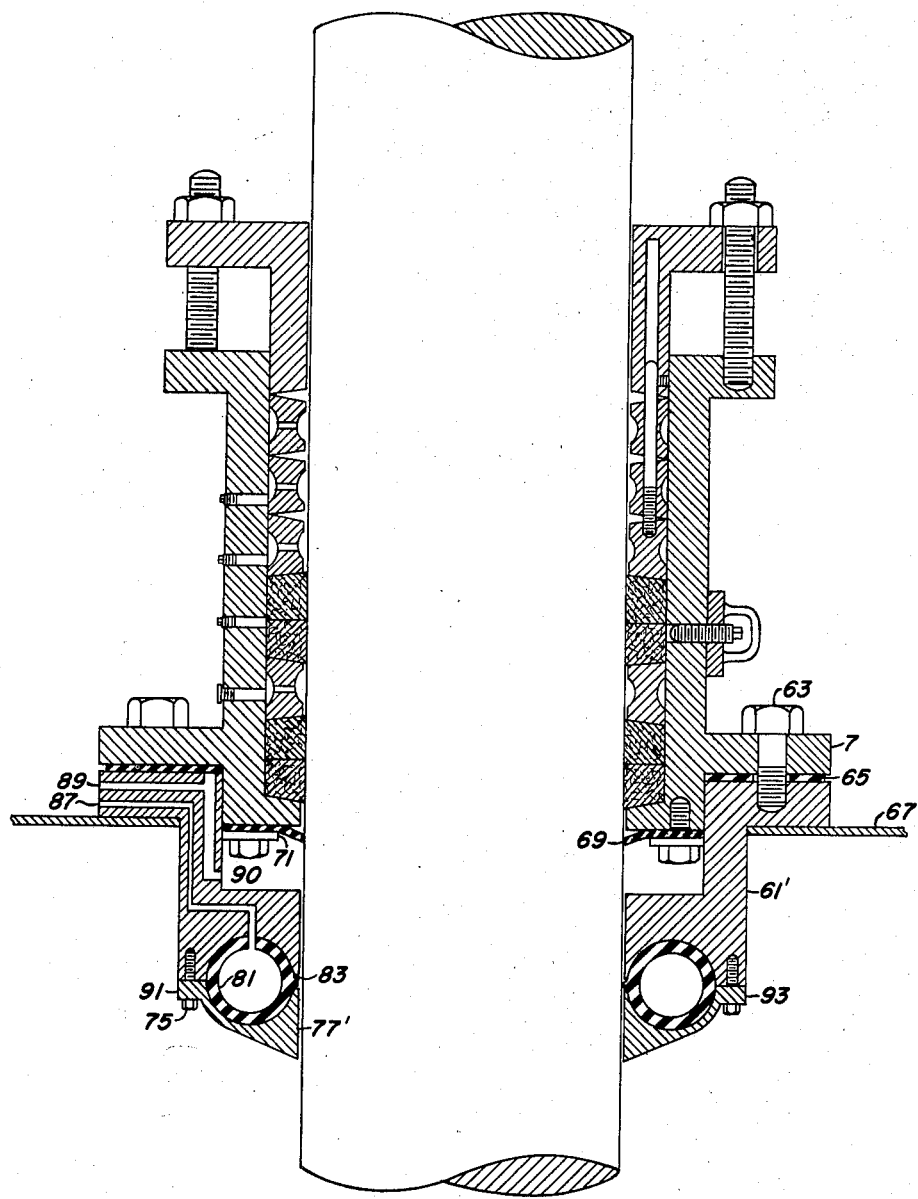
Figure 3 is a longitudinal cross-sectional view of a modified stuffing box and sealing device in accordance with my invention.

The modification of the device shown in Figures 3 and 4 enables the sealing tube 81 to be removed and replaced more easily. In this modification, instead of forming the annular metal casing 77 in one piece as shown in Figure 1, part of the casing is formed integrally as a part of adaptor 61' with a machined face or flange 91 and the other portion of the casing 77' is formed with a machined face or flange 93 adapted to abut against face 91 and be bolted thereto by means of bolts 75. In this modification, no gasket is necessary between the faces 91 and 93. The tube 81 in this modification will be split as shown in Figure 4 with the ends 95 and 97 sealed and shaped to fit snugly together when the tube is inflated. It will be apparent that in the event of failure of the sealing tube, the end 77' of the casing can be removed by removing the bolts 75 and the split tube withdrawn and replaced. The construction of the housing will otherwise be the same as is shown in Figure 1.

When it is desired to renew the packing in the stuffing box, the tube 81 is inflated with sufficient air or other gas pressure to prevent leakage of water between the tubing and the periphery of the shaft. It can be determined if the seal is holding by opening the valve at end of passageway 89. If water continues running, the seal has failed. After the effectiveness of the seal has been established, tightening gland 28 is removed and the lantern and packing rings withdrawn, and new packing rings substituted for the worn ones. This operation can be repeated indefinitely, or until such a time that the wear on the shaft indicates the necessity of advancing the packing elements to a new unworn area on the shaft.

In the event that it is desired to shift the position of the packing rings to a new area of the shaft, lantern ring 19 is set against the inside of flange 9 and the new set of packing members 15 is placed in the position shown on the drawing as being occupied by lantern ring 19. Lantern ring 21 is unfastened from the rod 39 and used to back the new packing members. A second set of packing rings will then be placed in the position occupied by lantern ring 21 in the drawing. In the newly assembled position, the threaded end of rods 39 would be threaded into tapped recesses 45 of lantern ring 23 and will pass through the bores 43 of lantern ring 25. To accomplish this shift, it is necessary to loosen set screws 40 whereupon rods 39 can be unscrewed. When the gland is reassembled, the rods 39 will extend farther back into bores 37 and the set screws 40 again tightened. It will be seen that the rod is threaded only into the lantern ring which is immediately adjacent to the right hand set of packing rings. This operation can be repeated three times, i. e., until lantern ring 25 is between the two sets of packings and grease inlet 55 is in use.

In the new position, then, lantern ring 21 will be directly opposite lock screws 57. In the new position, the grease inlets 49 would be plugged and grease inlets 51 connected to the grease line to provide grease for the lantern ring 21. In the position shown in the drawing, the only grease passageways which are connected to the grease supply are the passageways 49, the remaining passageways being plugged.

If the sealing tube fails when the lantern rings are in the new position with the lantern ring 21 in line with lock screws 57, lantern ring 21 can be locked by means of lock screws 57, the packing between lantern rings 21 and 23 renewed, and new packing in place thereof without dry-docking the boat.

It will be apparent that instead of using an adaptor to fasten the sealing chamber to the stuffing box, the ring 71 can be omitted and by fabricating the sealing ring with a suitable flange so that it can be bolted or otherwise fastened directly to body flange 7. In such case, the body flange will be supplied with the necessary air passageway for connection to the sealing tube and a water passageway for testing purposes.

It will also be evident that instead of using an inflatable tube as the sealing element, an elastomer type diaphragm can be secured in a rigid casing of metal, synthetic resin or other suitable material, adjacent to but spaced from the shaft, so as to form an air cavity between the diaphragm and the hollow casing surrounding the shaft. The air pressure would then be applied to the hollow space in the casing to depress and held the diaphragm in leak proof contact with the shaft.

It will be seen therefore that I have provided a method and apparatus, not only for making it possible to renew the packing in a propeller shaft or rudder stock stuffing box while the vessel is afloat, but that I have provided a method and apparatus for equalizing wear on a propeller shaft caused by friction between the packing rings and the propeller shaft.

What is claimed is:

1. A stuffing box for a propeller shaft comprising a rigid annular casing surrounding said shaft, said casing having an annular slot adjacent to said shaft, an inflatable annular member in said casing, means for inflating said member against said shaft, a stuffing box body adjacent to said casing and fastened thereto in fluid-tight relationship, an annular space adjacent said shaft between said casing and said body and a valved fluid passageway extending from the exterior of said casing into said space.

2. A stuffing box in accordance with claim 1 including a plurality of annular packing rings and lantern rings in said stuffing box body surrounding said shaft, said rings being formed with at least two bores and at least two threaded recesses, a tightening gland screwably mounted on the end of said body opposite the end adjacent to said casing, at least two longitudinal bores in said gland, rods slideable in said bores, set screws in said gland in line with said bores to hold said rods in a selected position, one end of said rods extending outside said bores and being threaded into the threaded recesses of one lantern ring and passing through the unthreaded bores of those lantern rings between the one into which the rods are threaded and the tightening gland.

3. A stuffing box in accordance with claim 1 in which said body is formed with a plurality of grease passageways spaced longitudinally along the body.

References Cited in the file of this patent

UNITED STATES PATENTS

| 1,319,464 | Durbin | Oct. 21, 1919 |
| 1,805,344 | Siefken | May 12, 1931 |
| 1,966,202 | Pfefferle | July 10, 1934 |
| 2,186,185 | Walker | Jan. 9, 1940 |
| 2,300,385 | Kollberg et al. | Oct. 27, 1942 |
| 2,351,343 | Kelley | June 13, 1944 |
| 2,366,824 | Zimmermann | Jan. 9, 1945 |
| 2,407,904 | Rosan | Sept. 17, 1946 |
| 2,648,554 | Gilbert | Aug. 11, 1953 |
| 2,649,316 | Beezley | Aug. 18, 1953 |
| 2,660,458 | Collins et al. | Nov. 24, 1953 |

FOREIGN PATENTS

| 1,793 | Great Britain | 1892 |